(12) United States Patent
Yan et al.

(10) Patent No.: US 8,743,310 B2
(45) Date of Patent: Jun. 3, 2014

(54) FLAT DISPLAY

(75) Inventors: Hua-Sheng Yan, Xiamen (CN); Hui Zhong, Xiamen (CN)

(73) Assignees: AU Optronics (Xiamen) Corp., Xiamen (CN); AU Optronics Corporation, Hsin-Chu (TW)

( * ) Notice: Subject to any disclaimer, the term of this patent is extended or adjusted under 35 U.S.C. 154(b) by 133 days.

(21) Appl. No.: 13/410,418

(22) Filed: Mar. 2, 2012

(65) Prior Publication Data

US 2013/0021782 A1     Jan. 24, 2013

(30) Foreign Application Priority Data

Jul. 22, 2011   (CN) .......................... 2011 1 0212569

(51) Int. Cl.
*G02F 1/133308* (2006.01)
*G02F 1/13452* (2006.01)

(52) U.S. Cl.
USPC ............. 349/58; 349/150; 362/632; 362/633; 362/634; 361/681; 361/752; 361/714; 361/679; 345/905; 348/794

(58) Field of Classification Search
USPC ............. 349/58, 150; 362/632–634; 361/681, 361/714, 752, 644, 728–730, 679; 313/582–587, 498–512; 345/905; 348/794, E5.128
See application file for complete search history.

(56) References Cited

U.S. PATENT DOCUMENTS

| 7,903,193 B2 * | 3/2011 | Oohira ............................. 349/58 |
| 7,978,284 B2 * | 7/2011 | Hashino .......................... 349/61 |
| 2003/0010378 A1 * | 1/2003 | Yoda et al. ..................... 136/251 |
| 2005/0024553 A1 * | 2/2005 | Fukuta et al. .................... 349/58 |
| 2009/0231507 A1 * | 9/2009 | Oohira ............................. 349/58 |
| 2010/0060816 A1 * | 3/2010 | Fukai et al. ...................... 349/58 |
| 2011/0032178 A1 | 2/2011 | Lee |
| 2011/0149195 A1 * | 6/2011 | Kobayashi ...................... 349/58 |

FOREIGN PATENT DOCUMENTS

| CN | 201021958 Y | 2/2008 |
| CN | 201021958 Y * | 2/2008 |
| JP | 2005-243572 | 9/2005 |
| JP | 2005243572 A * | 9/2005 |
| TW | I318311 | 12/2009 |
| TW | 201106052 | 2/2011 |

* cited by examiner

*Primary Examiner* — Michael Caley
*Assistant Examiner* — Jia Pan
(74) *Attorney, Agent, or Firm* — WPAT, PC; Justin King

(57) ABSTRACT

A flat display is disclosed, which includes a backlight module, a display panel, a flexible printed circuit board physically connected to the display panel, and a shielding double-sided tape for fastening the flexible printed circuit board on the backlight module. The shielding double-sided tape includes a frame shielding portion adhered to a front surface of the backlight module, and an extending portion extended from the frame shielding portion. A surface of at least one part of the extending portion is adhered to a back surface of the backlight module, and another surface of the least one part of the extending portion is adhered to the flexible printed circuit board.

6 Claims, 7 Drawing Sheets

FLAT DISPLAY

RELATED APPLICATIONS

This application claims priority to China Application Serial Number 201110212569.0, filed Jul. 22, 2011, which is herein incorporated by reference.

BACKGROUND

1. Technical Field

The present disclosure relates to a flat display. More particularly, the present disclosure relates to a flat display utilized in portable electronic devices.

2. Description of Related Art

Liquid crystal displays (LCDs) have been widely used in electrical products in recent times due to the rapid progress of optical technology and semiconductor technology. Moreover, with the advantages of high image quality, compact size, light weight, low driving voltage, and low power consumption, LCDs have been introduced into portable computers, personal digital assistants, and color televisions, and are gradually replacing the cathode ray tubes (CRTs) used in conventional displays. As a result, LCDs have become the most widely used display apparatus.

FIG. 1 is a cross-sectional diagram of a conventional flat display utilized in portable electronic devices. The flat display 100 includes the main elements of a backlight module 110, a display panel 120, and a flexible printed circuit board 130. The display panel 120 is disposed on the backlight module 110. The display panel 120 includes a first substrate 122 and a second substrate 124. The flexible printed circuit board 130 is physically connected to the second substrate 124 of the display panel 120 in order to control the display panel 120. The backlight module 110 includes a frame 112, a light source 114, a light guide plate 116, and optical films 118. The light source 114 has a substrate 115, and the substrate 115 is adhered to the frame 112 using a double-sided tape 140. Moreover, the light source 114 is disposed to a side of the light guide plate 116. The optical films 118 are disposed between the second substrate 124 and the light guide plate 116 and on the first substrate 122. An additional double-sided tape (not shown) is adhered to the flexible printed circuit board 130, and the flexible printed circuit board 130 is folded and adhered to the back surface of the frame 112 with the additional double-sided tape. The flat display 100 further includes a shielding double-sided tape 150. The shielding double-sided tape 150 is adhered to the bottom of the display panel 120 for attachment to the substrate 115 of the light source 114 and to cover a part of the light guide plate 116.

The flexible printed circuit board 130 of flat display 100 is not securely adhered to the backlight module 110, and therefore the display panel 120 may become separated from the frame 112. Furthermore, since the substrate 115 of the light source 114 is adhered to the display panel 120 through the shielding double-sided tape 150, upward displacement of the display panel 120 will result in the light source 114 being displaced upwardly together with the display panel 120. As a result, the light source 114 cannot be aligned precisely with the light guide plate 116, which may result in a light leakage problem.

The optical film 118 is disposed on the bottom of the display panel 120. A gap caused by the thickness of the optical film 118 is formed when the shielding double-sided tape 150 is adhered to the bottom of the display panel 120, and the adhering ability of the shielding double-sided tape 150 at the gap is reduced. The flat display 100 utilizes the double-sided tape 140 for fastening of the substrate 115 of the light source 114 and the flexible printed circuit board 130, and utilizes the shielding double-sided tape 150 to fasten the display panel 120 to the substrate 115 of the light source 114. As a result, costs associated with the double-sided tape 140 and the shielding double-sided tape 150 are difficult to reduce.

SUMMARY

An embodiment of the present invention provides a flat display, which includes a backlight module, a display panel, a flexible printed circuit board physically connected to the display panel, and a shielding double-sided tape for fastening the flexible printed circuit board on the backlight module. The shielding double-sided tape includes a frame shielding portion adhered to a front surface of the backlight module, and an extending portion extended from the frame shielding portion. A surface of at least one part of the extending portion is adhered to a back surface of the backlight module, and another surface of the least one part of the extending portion is adhered to the flexible printed circuit board. The extending portion can be disposed inside of the frame shielding portion. The extending portion may include a first folding piece connected to the frame shielding portion, a second folding piece connected to the first folding piece, and a third folding piece connected to the second piece. The first folding piece is adhered to the frame shielding portion. The second folding piece is adhered to a side surface of the backlight module. The third folding piece is adhered to the back surface of the backlight module. The extending portion can be disposed outside of the frame shielding portion. The extending portion may include a first folding piece connected to the frame shielding portion, and a second folding piece connected to the first folding piece. The first folding piece can be adhered to a side surface of the backlight module, and the second folding piece can be adhered to the back surface of the backlight module. The extending portion can be a T-shaped piece. The size of the extending portion can be smaller than the size of the flexible printed circuit board. The flexible printed circuit board has a bonding area, and the bonding area is disposed on a surface of the flexible printed circuit board facing away from the extending portion. The backlight module includes a frame. The frame includes a light source support, and a light source of the backlight module is disposed at the light source support. The frame shielding portion covers the light source and the light source support.

Another embodiment of the invention provides a flat display, which includes a display panel having a flexible printed circuit board, a backlight module, and a shielding double-sided tape. The backlight module has a front surface and a back surface. The display panel is disposed on the front surface of the backlight module. The shielding double-sided tape includes a shielding portion disposed on the front surface of the backlight module and disposed between the display panel and the backlight module, and an extending portion extended from the shielding portion. The extending portion is disposed on the back surface of the backlight module and is disposed between the backlight module and the flexible printed circuit board. There is an overlap area between the shielding portion and the extending portion, and the overlap area is disposed between the backlight module and the display panel.

The frame shielding portion and the extending portion of the shielding double-sided tape can be formed as a single piece. The shielding double-sided tape not only fastens the display panel and the backlight module, but also fastens the flexible printed circuit board on the backlight module firmly, which can reduce material costs and assembly time. In some embodiments, the extending portion is cut from the window area. Since the window area is a predetermined portion of the frame shielding portion that is cut out and thrown away, use of this portion of the frame shielding portion to form the extending portion results in a reduction in overall material costs.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
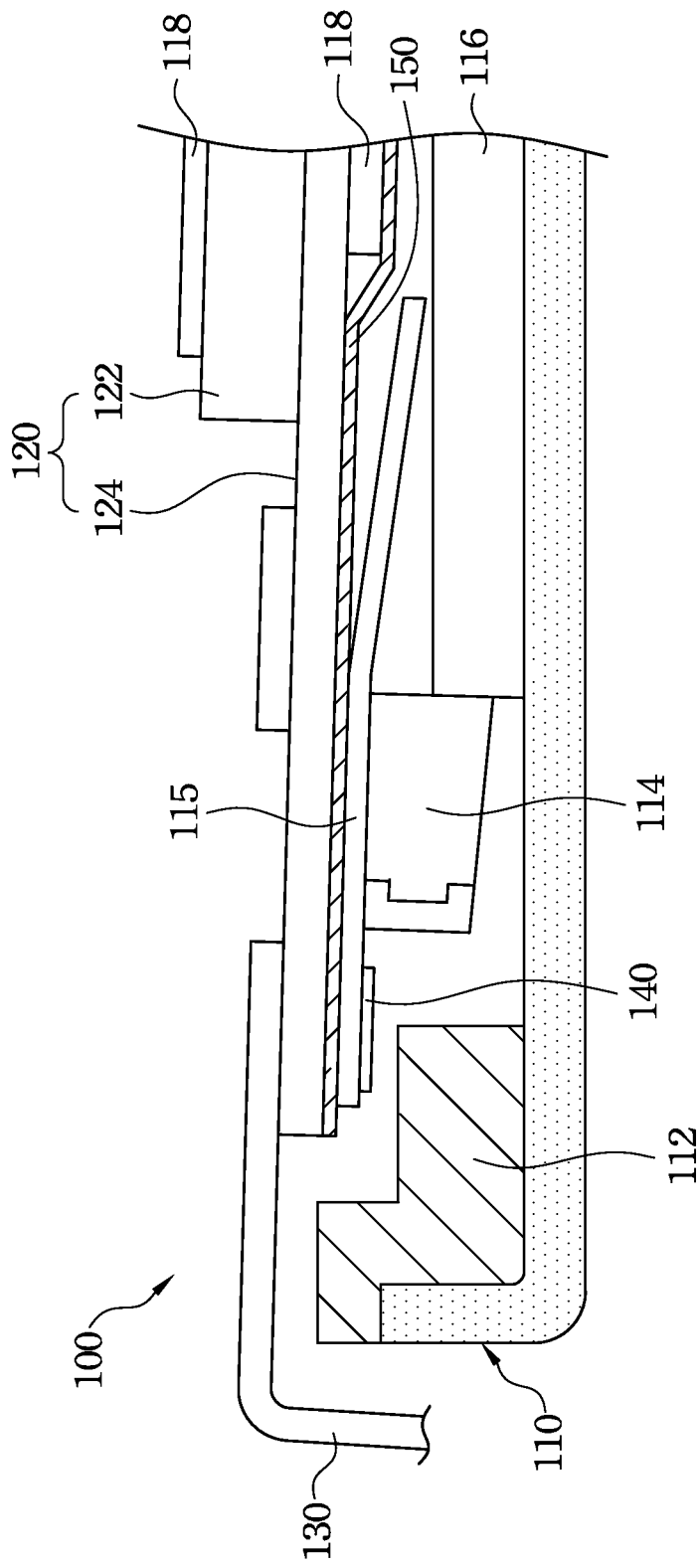
FIG. 1 is a cross-sectional diagram of a conventional flat display utilized in portable electronic devices.

Reference will now be made in detail to the present embodiments of the invention, examples of which are illustrated in the accompanying drawings. Wherever possible, the same reference numbers are used in the drawings and the description to refer to the same or like parts.

A double-sided tape for fastening a flexible printed circuit board and a shielding double tape for fastening a display panel are two individual components in the conventional flat display assembly. The embodiments of the present invention provide a shielding double-sided tape with a particular shape, such that a flexible printed circuit board can be fastened with the shielding double-sided tape. The shielding double-sided tape has a frame shielding portion, and an extending portion extended from the frame shielding portion. The frame shielding portion is adhered to a front surface of a backlight module. A surface of at least one part of the extending portion is adhered to a back surface of the backlight module, and another surface of the least one part of the extending portion is adhered to the flexible printed circuit board, so that the flexible printed circuit board can be fastened on the backlight module with the shielding double-sided tape.

Figure 2:
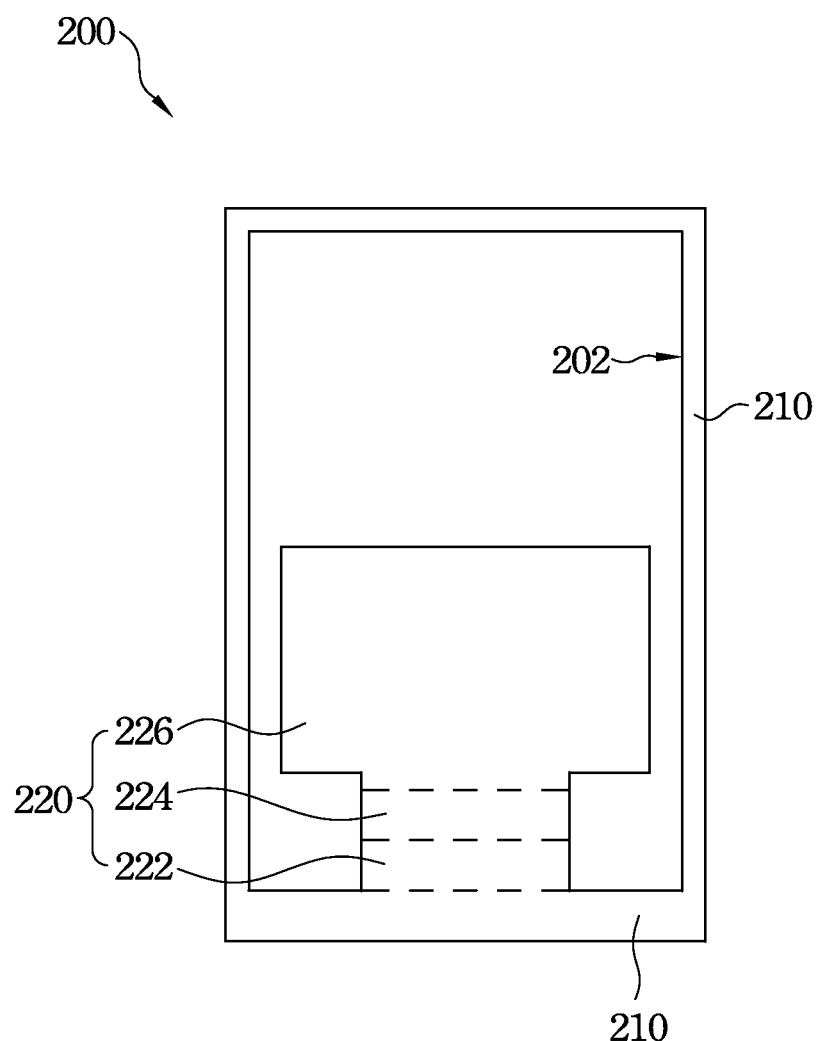
FIG. 2 is a top view of a shielding double-sided tape utilized in a flat display according to one embodiment of this invention.

FIG. 2 is a top view of an embodiment of the shielding double-sided tape utilized in a flat display of the invention. The shielding double-sided tape 200 has the frame shielding portion 210, and the extending portion 220 extended from the frame shielding portion 210. The extending portion 220 is disposed inside of the frame shielding portion 210. The extending portion 220 and the frame shielding portion 210 can be one-piece formed. The extending portion 220 and the frame shielding portion 210 can be both made of light shielding material. The extending portion 220 is cut from a part of the shielding double-sided tape 200 which corresponds to a display window area 202. The extending portion 220 includes a first folding piece 222, a second folding piece 224, and a third folding piece 226 connected in sequence. That is, the first folding piece 222 is connected to the frame shielding portion 210, the second folding piece 224 is connected to the first folding piece 222, and the third folding piece 226 is connected to the second folding piece 224, such that the second folding piece 224 is interposed between first and third folding pieces 222, 226. The extending portion 220 is a T-shaped piece, which can be folded easily and have larger adhesive surface. A release paper is disposed on both sides thereof. Perforated lines are formed in the release paper at boundaries between the frame shielding portion 210, the first folding piece 222, the second folding piece 224, and the third folding piece 226, so that the release paper can be easily removed.

Figure 3:
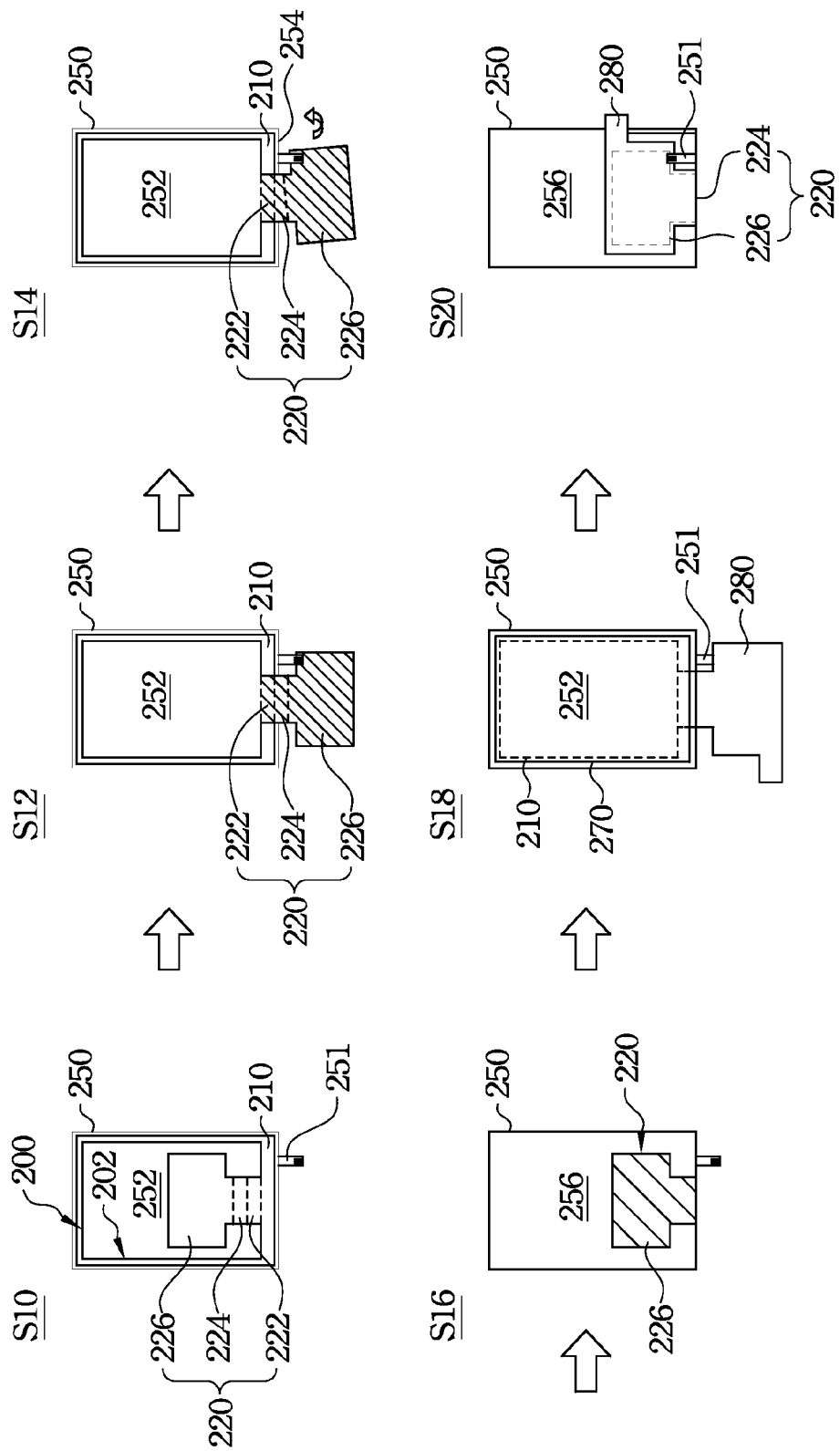
FIG. 3 is a schematic view illustrating sequential steps related to the shielding double-sided tape of FIG. 2 to thereby result in the formation of a flat display.

FIG. 3 is a schematic view illustrating sequential steps related to the shielding double-sided tape 200 of FIG. 2 to thereby result in the formation of a flat display. In step S10, the shielding double-sided tape 200 is adhered to the backlight module 250. The shielding double-sided tape 200 has adhesive layers on opposite sides thereof and two release papers disposed respectively on the opposite sides. The opposite sides of the shielding double-sided tape 200 (and of any of the different portions of the shielding double-sided tape 200) will be referred to hereinafter as rear and front sides. In this step, the release paper on the rear side of the frame shielding portion 210 is removed, and the frame shielding portion 210 is adhered to a front surface 252 of the backlight module 250. As described above, the extending portion 220 is connected to the frame shielding portion 210 and is disposed inside of the frame shielding portion 210. The front surface 252 of the backlight module 250 is the surface facing a display panel, which faces users. The display panel can be a liquid crystal display panel, a plasma display panel, an electrophoretic display panel, or any other type of flat display configuration. The backlight module 250 has a connecting circuit board 251.

Next, in step S12, the release paper on the front side of the frame shielding portion 210 and the release paper on the first folding piece 222 are removed. The extending portion 220 is then folded, and the first folding piece 222 is adhered to the frame shielding portion 210. Therefore, the rear side of the frame shielding portion 210 is adhered to the backlight module 250, and a portion of the front side of the frame shielding portion 210 is adhered to the first folding piece 222.

In step S14, the release paper on the front side of the second folding piece 224 is removed, after which the extending portion 220 is folded downward, such that the second folding piece 224 is adhered to a side surface 254 of the backlight module 250.

In step S16, the release paper on the front side of the third folding piece 226 is removed, after which the extending portion 220 is folded upward so that the third folding piece 226 is adhered to a back surface 256 of the backlight module 250. The back surface 256 of the backlight module 250 is opposite to the front surface 252.

In step S18, the release paper on the rear side of the first folding piece 222 is removed. The display panel 270 is subsequently disposed on the front surface 252 of the backlight module 250. The display panel 270 is attached to the backlight module 250 using the adhering ability of the frame shielding portion 210 and the first folding piece 222. The flexible printed circuit board 280 is subsequently physically connected to the display panel 270.

In step S20, the release paper on the rear side of the second folding piece 224 and the third folding piece 226 is removed. The flexible printed circuit board 280 and the connecting circuit board 251 are then folded. The folded flexible printed circuit board 280 is adhered to the second folding piece 224 and the third folding piece 226 and is positioned on the backlight module 250 firmly. The connecting circuit board 251 is connected to the flexible printed circuit board 280. The size of the extending portion 220 is smaller than the size of the flexible printed circuit board 280, so that the extending portion 220 can be hidden behind the flexible printed circuit board 280 after assembly and does not affect other components. For example, on the back surface 256, the length of the extending portion 220 is smaller than the length of the flexible printed circuit board 280, or the width of the extending portion 220 is smaller than the width of the flexible printed circuit board 280, or both the length and the width of the extending portion 220 are smaller than the length and the width of the flexible printed circuit board 280. The backlight module 250 is connected to the display panel 270 via the flexible printed circuit board 280 and the connecting circuit board 251. In addition, the frame shielding portion 210 is above of the backlight module 250 and the extending portion 220 is below the backlight module 250. It results that the extending portion is disposed inside of the frame shielding portion in vertical projection.

Figure 4:
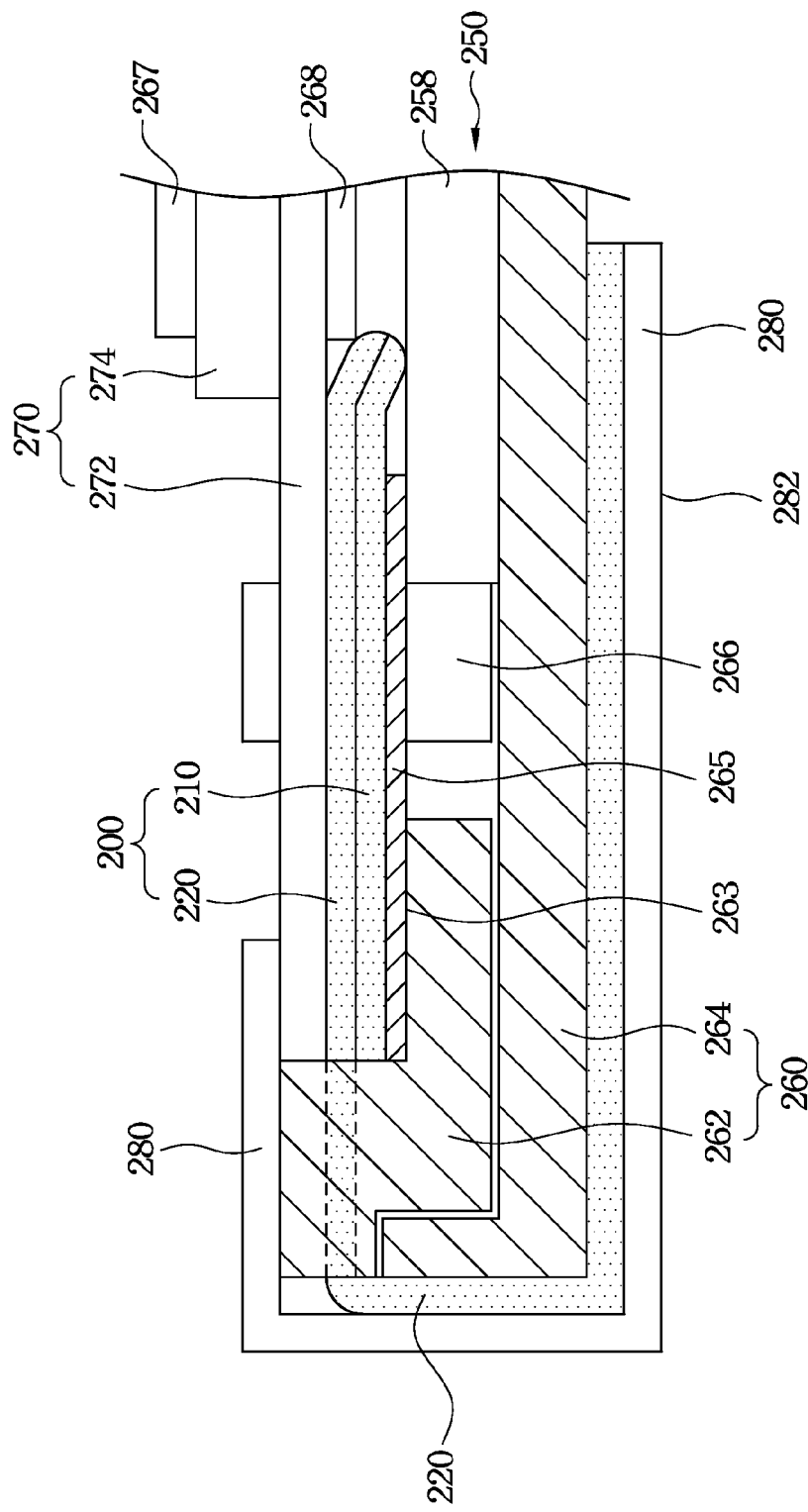
FIG. 4 is a cross-sectional diagram of the flat display of FIG. 3.

FIG. 4 is a cross-sectional diagram of the flat display of FIG. 3. The backlight module 250 includes a light guide plate 258, a frame 260, and a light source 266. The light guide plate 258 is disposed within the frame 260. The frame 260 includes a first casing 262 and a second casing 264. The first casing 262 has an opening, and the extending portion 220 may pass through the opening. The light guide plate 258 is disposed on the second casing 264. The first casing 262 has a light source support 263. A light source substrate 265 of the light source 266 is disposed on the light source support 263 and the light guide plate 258. The light source substrate 265 is adhered to the display panel 270 via the frame shielding portion 210 and the extending portion 220. The frame shielding portion 210 covers the light source 266 and the light source support 263. Namely, there is an overlap area between the frame shielding portion 210 and the extending portion 220 in order to fasten the display panel 270 on the backlight module 250. The display panel 270 includes a first substrate 272 and a second substrate 274. An upper polarizer 267 and a lower polarizer 268 are disposed on opposite sides of the display panel 270 respectively. In other embodiments, the first casing 262 may have a slot for containing the extending portion 220, and the extending portion 220 can be contained at the opposite side of the backlight module 250.

The flexible printed circuit board 280 is adhered to the whole surface of the extending portion 220, thereby being adhered to the backlight module 250 firmly. Therefore the lifting up of the flexible printed circuit board 280 due to unsuccessful adhering of the same can be reduced. Furthermore, there is an overlap area between the frame shielding portion 210 and the first folding piece 222 of the extending portion 220. Namely, the thickness of the shielding double sided tape 200 arranged above of the backlight module 250 is greater than the thickness of the shielding double sided tape below the backlight module 250. The overlap area can enhance the adhering ability and fill the gap formed by the presence of the lower polarizer 268. The light source 266 can be positioned firmly with the overlap area, and the situation in which the light source 266 is lifted up together with the flexible printed circuit board 280 can be prevented. The flexible printed circuit board 280 has a bonding area 282, and the bonding area 282 is disposed at the surface of the flexible printed circuit board 280 facing away from the extending portion 220. The bonding area 282 is exposed and is prevented from touching the backlight module 250.

In this embodiment, the extending portion 220 is formed at the window area 202 of the shielding double-sided tape 200. The window area 202 may be formed by cutting away and discarding a predetermined portion of the shielding double-sided tape 200. By such a design, the extending portion 220 of the present embodiment does not generate extra material costs, and therefore, costs associated with using an additional double-sided tape for fastening the flexible printed circuit board 280 can be avoided. The present embodiment uses the shielding double-sided tape 200 to position the display panel 270, the flexible printed circuit board 280, and the light source 266, and as a result, the overall material costs can be reduced.

The extending portion 220 can be a T-shaped piece as shown in FIG. 2. In other embodiments, the extending portion 220 can be a U-shaped piece or an L-shaped piece. In some embodiments, the material of the frame shielding portion 210 can be different from the material of the extending portion 220. For example, the frame shielding portion 210 may be made of a light shielding or light absorbing material, and the extending portion 220 may be made of a transparent material.

Figure 5:
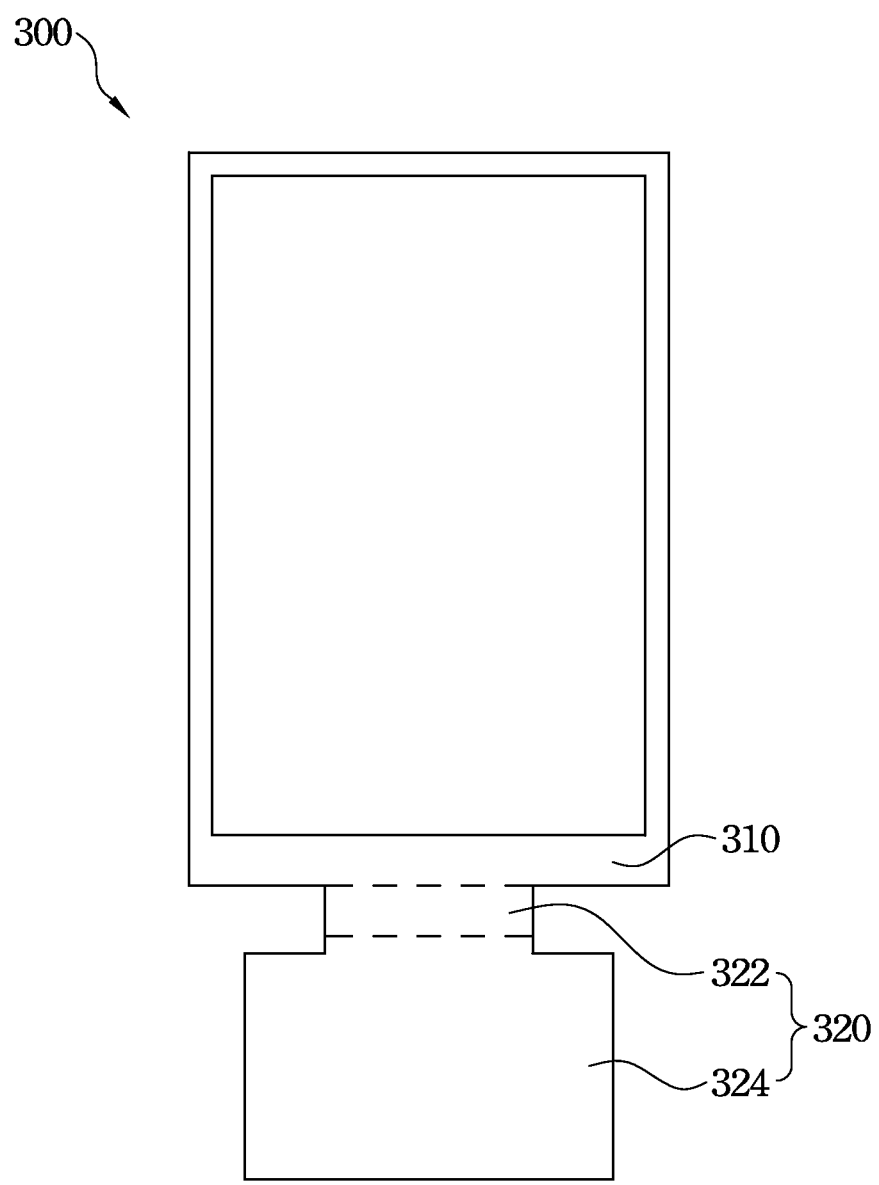
FIG. 5 is a top view of a shielding double-sided tape utilized in a flat display according to another embodiment of this invention.

FIG. 5 is a top view of a shielding double-sided tape utilized in a flat display according to another embodiment of this invention. The shielding double-sided tape 300 has the frame shielding portion 310, and the extending portion 320 extended from the frame shielding portion 310. The extending portion 320 and the frame shielding portion 310 are one-piece formed. The extending portion 320 and the frame shielding portion 310 can be both made of light shielding material. The extending portion 320 is disposed outside of the frame shielding portion 310. The extending portion 320 includes the first folding piece 322 and the second folding piece 324. The first folding piece 322 is connected to the frame shielding portion 310, and the second folding piece 324 is connected to the first folding piece 322, such that the first folding piece 322 is interposed between the frame shielding portion 310 and the second folding piece 324. The extending portion 320 is a T-shaped piece and a release paper is disposed on both sides thereof. Perforated lines are formed in the release paper at boundaries between the frame shielding portion 310, the first folding piece 322, and the second folding piece 324, so that the release paper can be easily removed.

Figure 6:
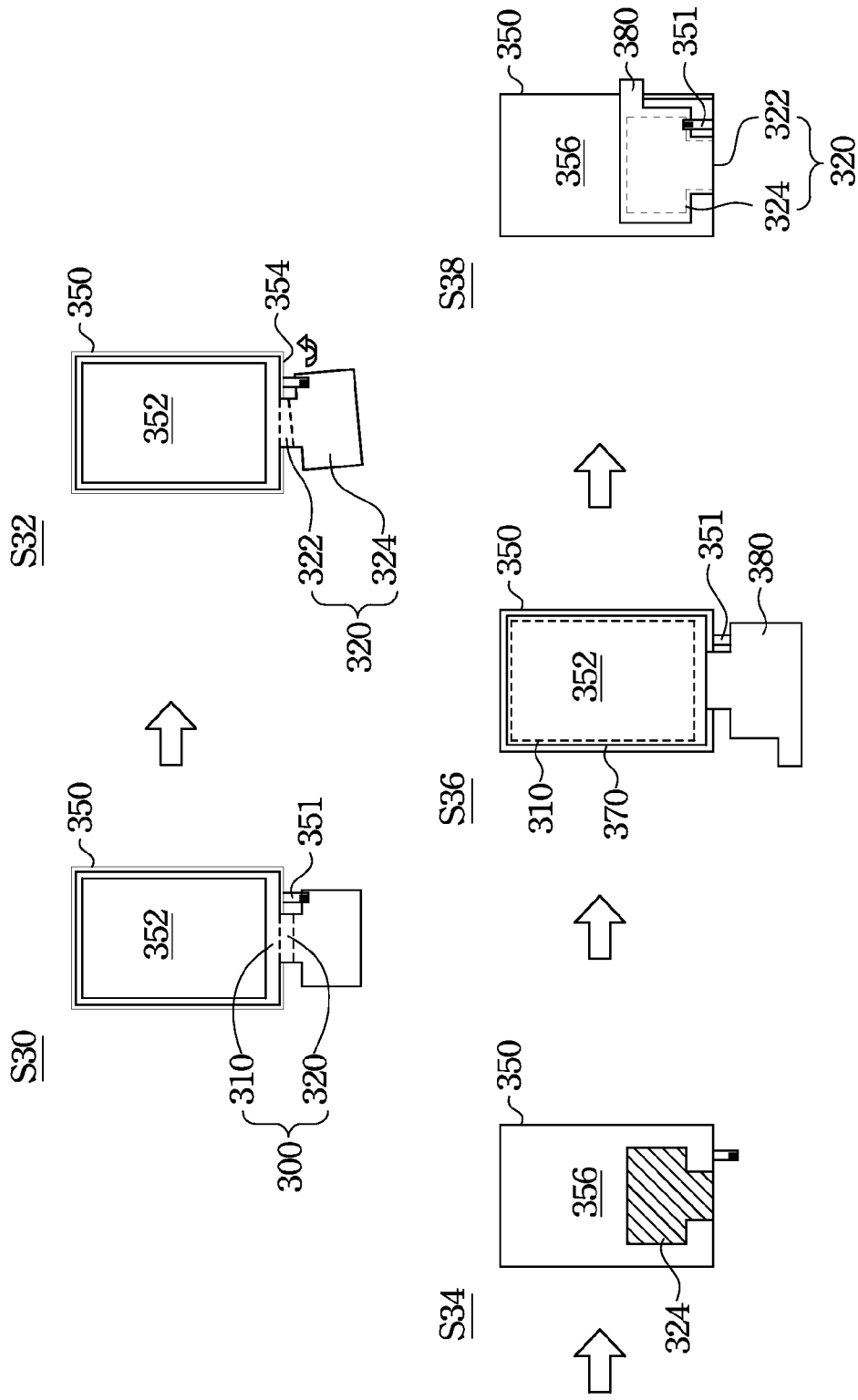
FIG. 6 is a schematic view illustrating sequential steps related to the shielding double-sided tape of FIG. 5 to thereby result in the formation of a flat display.

FIG. 6 is a schematic view illustrating sequential steps related to the shielding double-sided tape 300 of FIG. 5 to thereby result in the formation of a flat display. In step S30, the shielding double-sided tape 300 is adhered to the backlight module 350. The shielding double-sided tape 300 has adhesive layers on opposite sides thereof and two release papers disposed respectively on the opposite sides. The opposite sides of the shielding double-sided tape 300 (and of any of the different portions of the shielding double-sided tape 200) will be referred to hereinafter as rear and front sides. In this step, the release paper on the rear side of the frame shielding portion 310 is removed, and the frame shielding portion 310 is adhered to the front surface 352 of the backlight module 350. The extending portion 320 is connected to the frame shielding portion 310 and is disposed outside of the frame shielding portion 310.

Next, in step S32, the release paper on the rear side of the first folding piece 322 is removed. The extending portion 320 is then folded in a downward direction, and the first folding piece 322 is adhered to the side surface 354 of the backlight module 350.

In step S34, the release paper on the rear side of the second folding piece 324 is removed. The extending portion 320 is folded again onto the back surface 356 of the backlight module 350, such that the second folding piece 324 is adhered to the back surface 356 of the backlight module 350.

In step S36, the release paper of on the front side of the frame shielding portion 310 is removed. The display panel 370 is disposed on the front surface 352 of the backlight module 350. The display panel 370 is attached to the backlight module 250 using the adhering ability of the frame shielding portion 310. The flexible printed circuit board 380 is physically connected to the display panel 370.

In step S38, the release paper on the front side of the first folding piece 322 and the release paper on the front side of the second folding piece 224 are removed. The flexible printed circuit board 380 and the connecting circuit board 351 of the backlight module 350 are folded. The folded flexible printed circuit board 380 is adhered to the first folding piece 322 and the second folding piece 324 and is positioned on the backlight module 350 firmly. The connecting circuit board 351 is connected to the flexible printed circuit board 380. The size of the extending portion 320 is smaller than the size of the flexible printed circuit board 380, so that the extending portion 320 can be hidden behind the flexible printed circuit board 380. The backlight module 350 is connected to the display panel 370 via the flexible printed circuit board 380 and the connecting circuit board 351.

Figure 7:
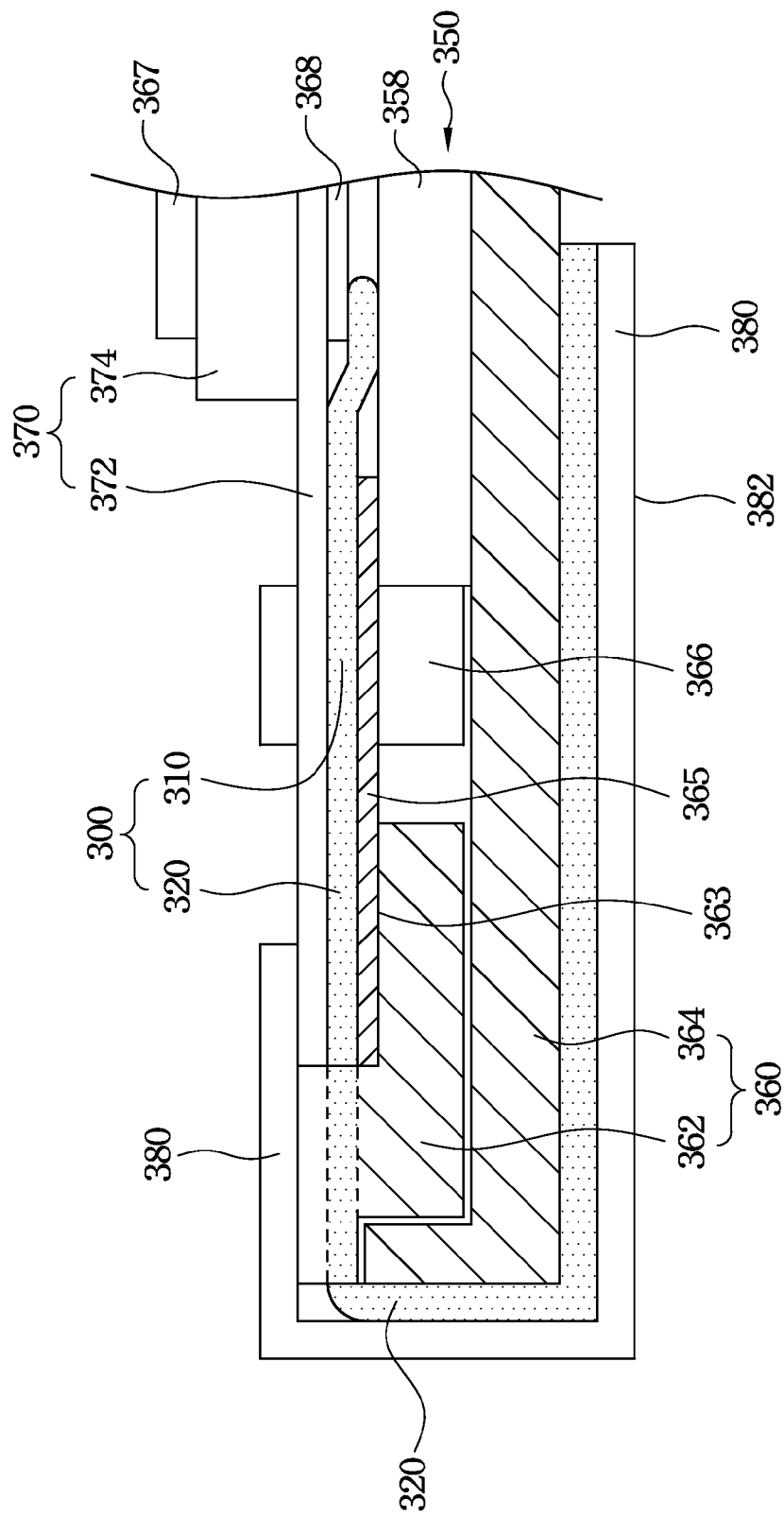
FIG. 7 is a cross-sectional diagram of the flat display of FIG. 6.

FIG. 7 is a cross-sectional diagram of the flat display of FIG. 6. The backlight module 350 includes the light guide plate 358, the frame 360, and the light source 366. The light guide plate 358 is disposed within the frame 360. The frame 360 includes the first casing 362 and the second casing 364. The first casing 362 has an opening, and the extending portion 320 may pass through the opening. The light guide plate 358 is disposed on the second casing 364. The first casing 362 has the light source support 363. The light source substrate 365 of the light source 366 is disposed on the light source support 363 and the light guide plate 358. The light source substrate 365 is adhered to the display panel 370 via the frame shielding portion 310 and the extending portion 320. The frame shielding portion 310 covers the light source 366 and the light source support 363. The display panel 370 includes the first substrate 372 and the second substrate 374. The upper polarizer 367 and the lower polarizer 368 are disposed on opposite sides of the display panel 370 respectively.

The flexible printed circuit board 380 is adhered to the whole surface of the extending portion 320, thereby being adhered to the backlight module 350 firmly. Therefore the lifting up of the flexible printed circuit board 380 due to unsuccessful adhering of the same can be reduced. The flexible printed circuit board 380 has the bonding area 382, and the bonding area 382 is disposed at the surface of the flexible printed circuit board 380 facing away from the extending portion 320. The bonding area 382 is exposed and is prevented from touching the backlight module 350.

According to the above embodiments, the frame shielding portion and the extending portion of the shielding double-sided tape can be formed as a single piece. The shielding double-sided tape not only fastens the display panel and the backlight module, but also fastens the flexible printed circuit board on the backlight module firmly, which can reduce material costs and assembly time. In some embodiments, the extending portion is cut from the window area, which is formed by cutting away and discarding a predetermined portion of the shielding double-sided tape, so that material costs can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their to equivalents.

What is claimed is:

1. A flat display comprising:
    a backlight module;
    a display panel disposed on the backlight module;
    a flexible printed circuit board physically connected to the display panel and bent to be under the backlight module; and
    a shielding double-sided tape for fastening the flexible printed circuit board on the backlight module, the shielding double-sided tape comprising:
        a frame shielding portion adhered to a front surface of the backlight module, and
    an extending portion extended from the frame shielding portion and disposed inside of the frame shielding portion in vertical projection, the extending portion comprising:
        a first folding piece connected to the frame shielding portion;
        a second folding piece connected to the first folding piece; and
        a third folding piece connected to the second piece, wherein the second folding piece is between the first folding piece and the third folding piece,
        wherein a surface of at least one part of the extending portion is adhered to a back surface of the backlight module, and another surface of the least one part of the extending portion is adhered to the flexible printed circuit board.

2. The flat display of claim 1, wherein the first folding piece is adhered to the frame shielding portion, the second folding piece is adhered to a side surface of the backlight module, and the third folding piece is adhered to the back surface of the backlight module.

3. The flat display of claim 1, wherein the extending portion is a T-shaped piece.

4. The flat display of claim 3, wherein the size of the extending portion is smaller than the size of the flexible printed circuit board.

5. The flat display of claim 1, wherein the flexible printed circuit board comprises a bonding area, and the bonding area is disposed on a surface of the flexible printed circuit board facing away from the extending portion.

6. The flat display of claim 1, wherein the backlight module comprises a frame, the frame comprises a light source support, a light source of the backlight module is disposed at the light source support, and the frame shielding portion covers the light source and the light source support.

* * * * *